United States Patent [19]

Kogure et al.

[11] Patent Number: 5,757,265
[45] Date of Patent: May 26, 1998

[54] MULTIPLE-CABLE FIELD BUS SYSTEM

[75] Inventors: Makoto Kogure, Katsuta; Koji Tomaoki, Hitachi; Toshimitsu Tsuchihashi, Katsuta, all of Japan

[73] Assignee: Hitachi, Ltd., Tokyo, Japan

[21] Appl. No.: 638,202

[22] Filed: Apr. 26, 1996

Related U.S. Application Data

[63] Continuation of Ser. No. 82,872, Jun. 29, 1993, abandoned.

[30] Foreign Application Priority Data

Jul. 15, 1992 [JP] Japan ................................. 4-188317

[51] Int. Cl.[6] ........................................... H04M 11/04
[52] U.S. Cl. ................... 340/310.01; 340/507; 340/508; 340/509; 340/825.06; 340/825.52; 340/825.54; 324/539; 324/540; 455/3.1
[58] Field of Search ........................ 340/507, 508, 340/509, 310.01, 310.06, 310.08, 825.06, 825.08, 825.52, 825.54; 324/539, 540, 512

[56] References Cited

U.S. PATENT DOCUMENTS

| | | | |
|---|---|---|---|
| 3,827,029 | 7/1974 | Schlotterrer et al. | 370/62 |
| 4,084,232 | 4/1978 | Woods et al. | 364/200 |
| 4,357,545 | 11/1982 | Le Grand et al. | 307/64 |
| 4,459,491 | 7/1984 | Ziegler | 307/64 |
| 4,484,275 | 11/1984 | Katzman et al. | 364/200 |
| 4,567,557 | 1/1986 | Burns | 364/145 |
| 4,989,671 | 2/1991 | Lamp | 370/62 |
| 5,027,347 | 6/1991 | Malkki | 370/62 |

FOREIGN PATENT DOCUMENTS

| | | |
|---|---|---|
| 56-143100 | 11/1981 | Japan. |
| 3-143036 | 6/1991 | Japan. |
| 4-37320 | 2/1992 | Japan. |

*Primary Examiner*—Jeffery Hofsass
*Assistant Examiner*—Daryl C. Pope
*Attorney, Agent, or Firm*—Kenyon & Kenyon

[57] ABSTRACT

A field bus system may be used in which transmission ability of the system can be maintained even if communication error occurs due to noises or failure of a transmission line. The system can be easily shifted at a lower cost from a conventional system to the field bus system without degrading the high reliability thereof. The transmission line is constituted by a multiple-cable transmission line having at least three transmission cables. An external power supply supplies power to field devices through a pair of transmission cables of the multiple-cable transmission line. The field devices are connected to the transmission cables through a transmission line switching unit constituted by a plurality of rectifier elements, so that the field devices are supplied with current flowing in one predetermined direction when any of the pairs of transmission cables is selected. The external power supply monitors a failure of a currently used pair of transmission cables and, upon detection of failure of the currently used pair of transmission cables, the failed pair is replaced by a normal pair of transmission cables such that the field devices are continuously supplied with power.

20 Claims, 11 Drawing Sheets

MULTIPLE-CABLE FIELD BUS SYSTEM

This application is a continuation of application Ser. No. 08/082,872 filed Jun. 29, 1993, which is now abandoned.

BACKGROUND OF THE INVENTION

The present invention generally relates to field bus systems and, more particularly, is directed to a multiple-cable field bus system for performing communication between a plurality of field devices and an upper-rank apparatus.

The field devices, in general, detect physical quantities such as pressure, temperature, flow rate and the like at respective points in various kinds of plants, converting the values of the detected physical quantities into electric signals and transmitting the electric signals to an upper-rank apparatus. Further, the field devices receive control signals transmitted from the upper-rank apparatus to control the valves or the like of the plants. In this case, when analog signals are employed as the electric signals, the analog signals are standardized as a current signal of 4 to 20 mA and transmitted between the field devices and the upper-rank apparatus by way of one-directional communication.

In recent years, a field device containing a microprocessor has been developed with the advance of the semiconductor integrated circuit technique and has been put into practical use. According to the thus constituted field device, not only one-directional communication can be made by analog signals through a transmission line but two-way communication can be made by digital signals through the transmission line. Further, the field device has been developed so that the range setting of the field device, the self diagnosis thereof, and the like can be instructed remotely by using the two-way communication.

Recently, a field bus system has been proposed in which a plurality of field devices are connected onto one transmission line by means of a multidrop system to perform two-way communication with only digital signals. This system is disclosed in Japanese Patent Document No. J.P.A.56-143100 and Japanese Patent Document No. J.P.A.3-143036, for example.

A typical example of the structure of the field bus system employing the multidrop system will be described with reference to FIG. 14. Referring to FIG. 14, a plurality of, for example, three field devices $102_{-1}$ to $102_{-3}$ are connected in a tree-liked manner to one end of a transmission line 101 having a pair of two cables and an upper-rank apparatus 103 is connected to the other end of the transmission line.

The field devices $102_{-1}$ to $102_{-3}$ are operated by electric power supplied from an external power supply 104 through the transmission line 101, and perform processes such as transmission of detected physical quantities to the upper-rank apparatus 103 through the transmission line 101 and reception of control signals transmitted from the upper-rank apparatus 103. An upper-rank communication device 105 is connected between the field devices $102_{-1}$ to $102_{-3}$ and the upper-rank apparatus 103 and also between the field devices and the external power supply 104 and makes two-way communication with each of the field devices $102_{-1}$ to $102_{-3}$ and the like through digital signals. Terminators 106F and 106R are connected to opposite ends of the transmission line 101. Each of the terminators is constituted by a resistor and a capacitor connected in series with each other.

In the case where the system is shifted from the conventional system using analog signals to the field bus system configured in the above-described manner, the upper-rank apparatus and the field devices must be replaced by apparatus and devices adapted for the field bus system. Because the transmission line of the conventional system, however, can be directly used as the transmission line of the field bus system, the system can be shifted to the field bus system easily. Further, in the field bus system, since the number of field devices connected onto the transmission line can be increased, the system can be extended easily.

SUMMARY OF THE INVENTION

In the aforementioned conventional technique, however, not only the number of field devices connected to one transmission line is increased when the system is shifted from the conventional system to the field bus system but communication is made by digital signals. In this respect, the field bus system has a problem in that the field devices, which have been controlled periodically, can not be controlled when communication error occurs frequently. Further, the field bus system has no consideration in the point of view of reliability against noise in comparison with the conventional system. In particular, in the case of communication error due to failure in the transmission line, electric power can not be supplied to any of the field devices connected to the communication line at all. There is no consideration, however, in that all the field devices can not be operated in this case.

Although a method of employing redundant structure in the field bus may be considered in order to improve the reliability of the field bus system, a problem arises that there is no merit for shifting the system from the conventional system to the system employing this method in view of cost performance because each of the field devices must contain an interface.

The present invention provides a multiple-cable field bus system in which the aforementioned shortcomings and disadvantages encountered with the prior art can be eliminated.

More specifically, the present invention provides a multiple-cable field bus system which can maintain transmission ability even if communication error occurs due to noise or failure in a transmission line and can be shifted easily from the conventional system at a lower cost while maintaining high reliability.

In addressing the foregoing, the multiple-cable field bus system according to one aspect of the present invention for performing communication mutually between field devices for detecting physical quantities such as pressure or the like and an upper-rank apparatus, has an external power supply for supplying electric power to the field devices, and terminators, and the multiple-cable field bus system includes: a multiple-cable transmission line having at least three transmission cables for preforming communication mutually between field devices and the upper-rank apparatus; a first transmission line switching unit connected between the multiple-cable transmission line and the field devices for supplying a communication signal to the field devices, even either one of a pair of the transmission cables of the multiple-cable transmission line are selected, through the selected one pair of the transmission cables; a second transmission line switching unit connected between the multiple-cable transmission line and the upper-rank apparatus for supplying the communication signal to the upper-rank apparatus, even either one of the pairs of the transmission cables of the multiple-cable transmission line are selected, through the selected one pair of the transmission cables; wherein the external power supply supplies electric power to the selected pair of transmission cables of the multiple-cable transmission line, determining whether the selected pair of transmission cables have failed or not, and, when it is determined that the selected pair of transmission cables have failed, supplying electric power to another pair of transmission cables of the multiple-cable transmission line in place of the failed pair of transmission cables.

In the multiple-cable field bus system according to a preferred embodiment of the present invention, the external power supply includes: pairs of direct current power supplies and switches, the current power supply and the switch of each pair being connected in series between a corresponding one of all pairs of transmission cables of the multiple-cable transmission line; a detecting unit for detecting a failure which has occurred in each of the pairs of transmission cables and for outputting a failure detection signal; and a transmission cable selecting unit for opening the switch connected between a fail one of the pairs of transmission cables and closing the switch connected between a normal one of the pairs of transmission cables in accordance with the failure detection signal.

In the multiple-cable field bus system according to a preferred embodiment of the present invention, each of the pairs of direct current power supplies and switches of the external power supply further includes a load resistor connected in series with the direct current power supply and the switch, and the detecting unit detects a failure which has occurred in each of the pairs of transmission cables in accordance with a voltage across the load resistor thereof.

In the multiple-cable field bus system according to the one aspect of the present invention, preferably the external power supply includes a selection sequence setting unit for setting a sequence selection of the the all pairs of transmission cables of the multiple-cable transmission line, and the transmission cable selecting unit selects a normal one of the pairs of transmission cables in accordance with the sequence set by the selection sequence setting unit.

In the multiple-cable field bus system according to a preferable embodiment of the present invention, the transmission cable selecting unit includes a storage unit for storing information as to the fail pair of transmission cables.

In the multiple-cable field bus system according to a preferred embodiment of the present invention, each of the first and second transmission line switching units includes a plurality of rectifier elements connected between the multiple-cable transmission line and one end of the field devices or the upper-rank apparatus for transmitting the communication signal only to a direction from the multiple-cable transmission line to the one end, and further includes a plurality of rectifier elements connected between the multiple-cable transmission line and the other end of the field devices or the upper-rank apparatus for transmitting the communication signal only to a direction from the other end to the multiple-cable transmission line.

In the multiple-cable field bus system according to a preferred embodiment of the present invention, at least one of the field devices and the first transmission line switching unit are integrated.

In the multiple-cable field bus system according to a preferred embodiment of the present invention, the upper-rank apparatus and the second transmission line switching unit are integrated.

In the multiple-cable field bus system according to a preferred embodiment of the present invention, both the first transmission line switching unit and the terminator are arranged in a junction box provided in a field.

In the multiple-cable field bus system according to a preferred embodiment of the present invention, the multiple-cable transmission line connected between the upper-rank apparatus and the junction box is divided in at least two paths.

In the multiple-cable field bus system according to a preferred embodiment of the present invention, an impedance value of the terminator is changed depending on a number of cables of the multiple-cable transmission line.

In the multiple-cable field bus system according to a preferred embodiment of the present invention, the multiple-cable transmission line includes a plurality of parallel transmission cables, and a pair of transmission cables adjacently disposed with each other is selected for performing mutual communication between the field devices and the upper-rank apparatus.

In the multiple-cable field bus system according to a preferred embodiment of the present invention, the system further includes a unit for displaying the information as to the failed pair of transmission cables stored in the storage unit.

According to the thus constituted multiple-cable field bus system of the present invention, an arbitrary one of the pairs of transmission cables is selected by the external power supply, and electric power or a signal is supplied to the upper-rank apparatus and the field devices through the pair of transmission cables selected by the external power supply by way of the transmission line switching units connected to the upper-rank apparatus and the field devices, respectively. When a failure occurs in the currently used pair of transmission cables, the external power supply detects this failed and replaces the failure pair of transmission cables with a normal pair of transmission cables, so that the electric power or the signal is continuously supplied to the upper-rank apparatus and the field devices through the normal pair of transmission cables.

Accordingly, since, even if communication error occurs due to failure of the currently used pair of transmission cables, the failed pair are replaced with a normal pair of transmission cables, the communication can be continued and transmission ability of the system can be maintained without degrading the high reliability of the system.

The preceding and other objects, features, and advantages of the present invention will become apparent from the following detailed description of illustrative embodiments thereof when read in conjunction with the accompanying drawings.

DETAILED DESCRIPTION OF THE PREFERRED EMBODIMENTS

Figure 1:
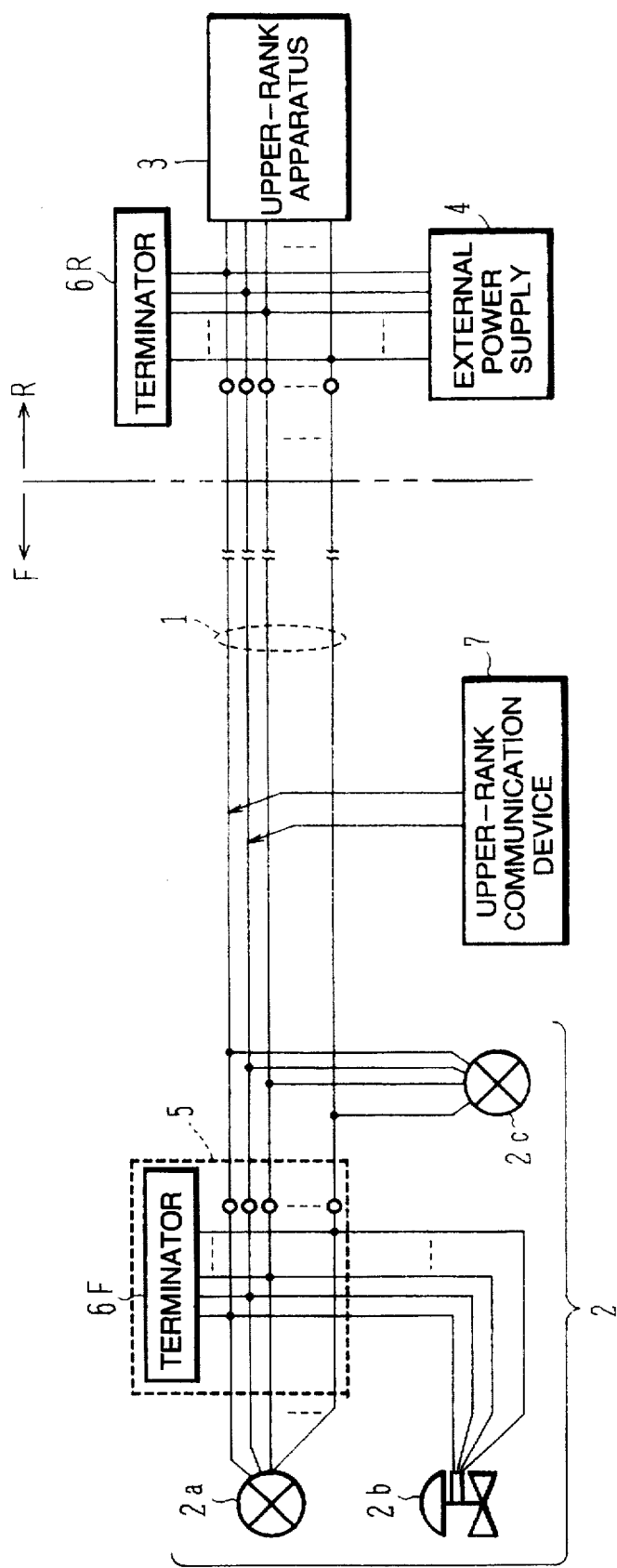
FIG. 1 is a schematic diagram showing an arrangement of a multiple-cable field bus system according to a first embodiment of the present invention.

Embodiments of the present invention will be described hereunder with reference to the accompanying drawings, and like reference numerals are used to identify the same or similar parts in the several views.

A multiple-cable field bus system according to a first embodiment of the present invention will be described with reference to FIGS. 1 to 10.

Figure 2:
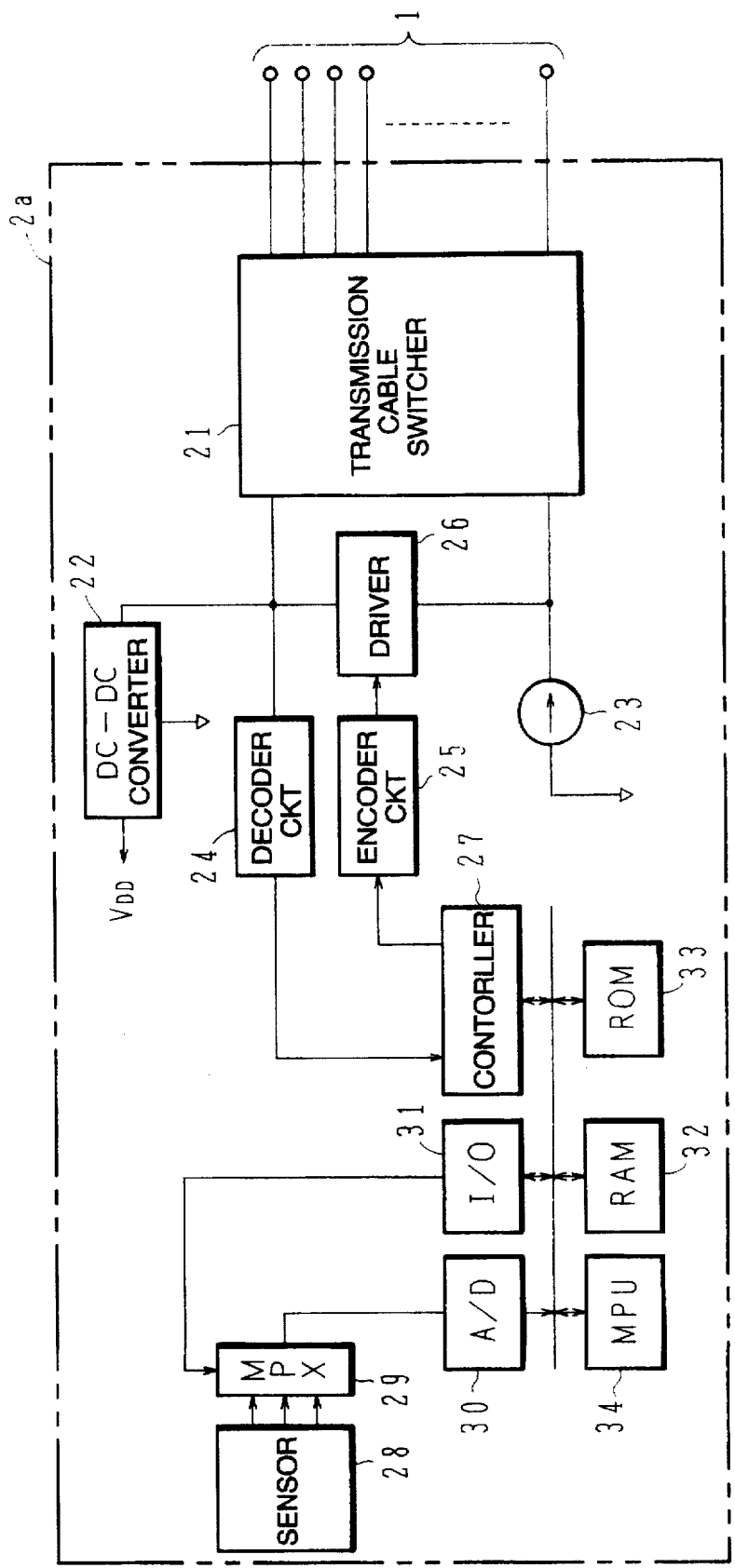
FIG. 2 is a block diagram showing an arrangement of an example of a field device shown in FIG. 1.

FIG. 1 shows an arrangement of the first embodiment of the present invention. Referring to FIG. 1, a section F represents a field and a section R represents a control room. A multiple-cable transmission line 1 is constituted by a multiplicity of transmission cables. All of the transmission cables are grouped into a multiplicity of pairs of arbitrary two transmission cables, which thereby constitute a multiplicity of pairs of transmission cables. Each of various field devices 2 (2a, 2b, 2c) is connected to the respective pairs of transmission cables in the field section F, and an upper-rank apparatus 3 is connected to the respective pairs of transmission cables in the control room section R. A multiple-cable terminator 6F provided in a junction box (relay terminal panel) 5 is connected to the respective pairs of the transmission cables in the field section F. Each of an external power supply 4 and a multiple-cable terminator 6R is connected to the respective pairs of the transmission cables in the control room section R. An upper-rank communication device 7 is connected to an arbitrary pair of the transmission cables in the field section F. In the case where the multiple-cable transmission line 1 is used as a field bus, the number of the field devices connected to the multiple-cable transmission line 1 as well as the length of the transmission line 1 is limited, but the field devices may be connected to arbitrary portions of the transmission line. In this respect, while, in the first embodiment, the two field devices 2a and 2b are connected to the transmission line 1 through the junction box 5 and the field device 2c is connected on the way of the transmission line 1, the field devices may be connected to other portions on the transmission line 1 and the number of the field devices connected to the transmission line may be changed within the limited total number. Each of the field devices 2 is operated by electric power supplied from the external power supply 4 through an arbitrary pair of transmission cables of the transmission line 1 selected by the external power supply 4 as described later. Each of the field devices 2 performs two-way serial communication by digital signals in a manner that it transmits detected physical quantities such as pressure, temperature, flow rate and the like obtained in the processes of various plants to the upper-rank apparatus 3 through the transmission line. Each of the field devices 2 also receives control signals for a valve or the like transmitted from the upper-rank apparatus 3. A typical example of the field device 2a is a differential pressure transmitter. FIG. 2 shows an arrangement of a differential pressure transmitter.

Figure 3:
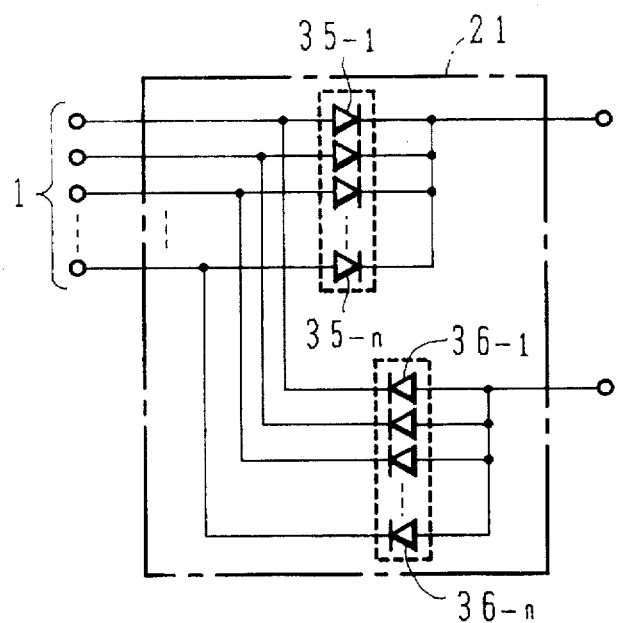
FIG. 3 is a schematic diagram of a transmission cable switcher.

Referring to FIG. 2, the field device (the differential pressure transmitter) 2a includes a transmission cable switcher 21 for selectively connecting the device to a pair of transmission cables of the transmission line 1 selected by the external power supply 4, and a DC—DC converter 22 for generating a voltage $V_{DD}$ necessary for operating the device 2a based on a voltage supplied from the external power supply 4. The field device 2a further includes a constant-current circuit 23 for controlling total current consumed by the internal circuits of the device at a constant value, a decoder circuit 24 for decoding received control signals or the like, an encoder circuit 25 for encoding detected values or the like, a driver 26 for transmitting a digital signal encoded by the encoder circuit 25 to the transmission line, and a controller 27 for controlling the received signals and the signals to be transmitted. The field device 2a additionally includes a composite sensor 28 for detecting differential pressure, static pressure, temperature or the like, a multiplexer (MPX) 29 for selectively inputting the detected signals of the composite sensor 28 in accordance with an input change-over signal described later, an analog-to-digital (A/D) converter 30 for converting the detected signal selected by the multiplexer 29 into a digital signal, an input/output (I/O) interface 31 for outputting the input change-over signal to the multiplexer 29, and a microprocessor (MPU) 34 for controlling the respective circuits of the device and performing processing by utilizing various data stored in a random access memory (RAM) 32 and a read only memory (ROM) 33. The transmission cable switcher 21 is constituted by a plurality of rectifier elements $35_{-1}$ to $35_{-n}$ and $36_{-1}$ to $36_{-n}$ as shown in FIG. 3 in a manner that a polarity of consumed current is always kept constant.

Figure 4:
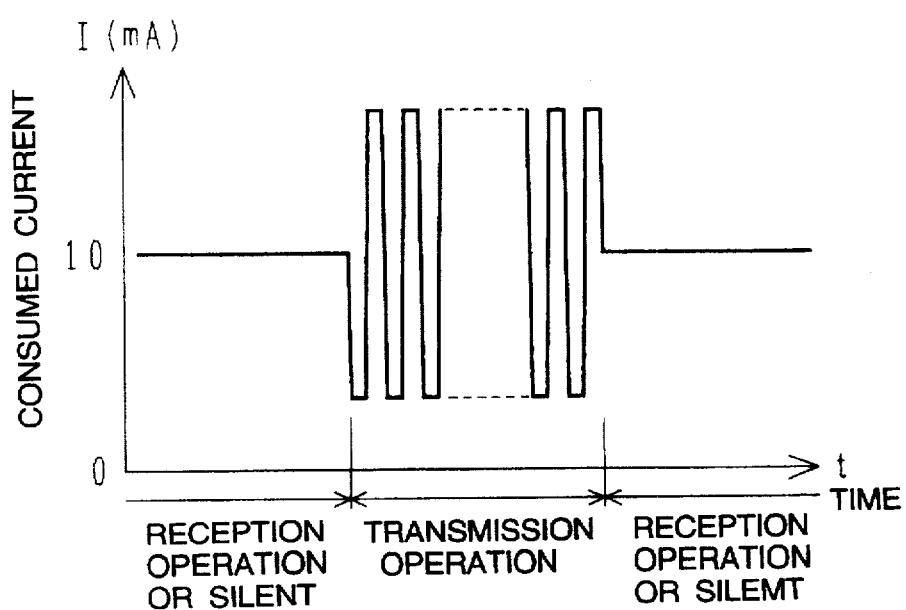
FIG. 4 shows a waveform diagram of consumed current of the field device of FIG. 1.

Current consumed by the field device 2a is controlled at a constant value of, for example, 10 mA by the constant-current circuit 23, so that as shown in FIG. 4 the consumed current is always kept constant except for a period of transmission operation. During the transmission operation, the consumed current has a waveform such that a communication signal having equal positive and negative amplitudes with respect to a constant consumed current value is added to the constant consumed current and so the consumed current changes in a range of the same polarity. While, in the first embodiment, the current consumed by the field device is set to 10 mA, the consumed current may differ between field devices so long as it is a constant value and satisfies the aforementioned condition.

In the thus constituted field device 2a, detected signals representing differential pressure, static pressure, temperature or the like detected by the composite sensor 28 are applied to the multiplexer 29. The multiplexer 29 selects one of the detected signals in accordance with the input change-over signal supplied from the I/O interface 31. The selected signal from the multiplexer 29 is converted into a digital signal by the A/D converter 30. Under the control of the microprocessor 34, each of the digital signals sequentially output from the A/D converter 30 is corrected based on various data stored in the RAM 32 and ROM 33. A true value is thereby obtained and then stored in the RAM 32.

The communication operation in the field device 2a is performed in the following manner. Upon a transmission operation, data in the RAM 32 is read out in response to a command from the microprocessor 34 and output from the controller 27 as a serial digital signal train. The digital signal train is encoded by the encoder circuit 25 and output to a pair of transmission cables by the driver 26 through the transmission cable switcher 21. The encoder circuit 25 employs an encoding method such as a method for converting the digital signal train into the Manchester codes of the baseband signal or a frequency modulation method for modulating the digital signal train by two kinds of frequencies corresponding to binary values "0" and "1" of the digital signal. The driver 26 employs a driving method such as a method of outputting the encoded signal in the form of a voltage signal or a current signal.

Upon a receiving operation, the communication signal transmitted through a pair of the transmission cables is received by the decoder circuit 24 through the transmission cable switcher 21. The decoder circuit 24 decodes the encoded signal transmitted through the transmission cable switcher into a serial digital signal train and then applies it to the controller 27 as digital data constituted by binary values "0" and "1". The data input into the controller 27 is taken out as received data by the microprocessor 34. In this case, there is no problem in the communication process so long as the communication signal is received by the transmission cable switcher 21 through either one pair of the transmission cables of the multiple-cable transmission line 1. Therefore, even when a failure occurs of a pair of transmission cables currently being used and the currently used pair is replaced by another pair of transmission cables, the microprocessor 34 is not required to recognize this replacement. As a result, the transmission line can be switched immediately upon failure of the transmission line and the communication operation can be continued irrespective of the failure of the transmission line, so that the system can improve the reliability thereof while maintaining the multiple-processing ability thereof.

The upper-rank apparatus 3 is arranged in the control room R as shown in FIG. 1 and performs communication processing with the field devices 2 through a pair of transmission cables such as reception of various physical quantities detected by the field devices 2, and transmission of control information for the plants such as the control signal for the valve to the field devices 2. The upper-rank apparatus 3 includes a transmission cable switcher like the transmission cable switcher 21 of the field device 2 and is constituted so that its consumed current satisfies the condition like the aforementioned condition of the field device 2. The upper-rank apparatus 3, therefore, can communicate with other devices irrespective of the condition of the multiple-cable transmission line like the field devices.

Each of the multiple-cable terminators 6F and 6R is constituted by a multiplicity of terminators each constituted by a resistor and a capacitor connected in series. The terminators are connected at opposite ends of the multiple-cable transmission line 1 in a manner that each of the terminators is connected between a corresponding one of all pairs of transmission cables of the transmission line 1 at a corresponding one of the opposite ends of the transmission line 1. Each of the multiple-cable terminators 6F and 6R is provided for adjusting a load. That is, an impedance of each of the multiple-cable terminators is set to be a very small value than relative to the input impedances in the communication frequency band of the field devices 2, the upper-rank apparatus 3 and the upper-rank communication device 7 connected to the multiple-cable transmission line 1. Thus, the communication signals are less influenced by conditions such as the number of the devices connected to the transmission line and the connecting portions thereof or the like. Since the impedances of the multiple-cable terminators 6F and 6R are set to be a small value, when either one of the terminators 6F and 6R is disconnected from the transmission line 1, an impedance in the communication frequency band seen from the respective devices is increased by two times as follows. In the case where transmission signals from the respective devices are of the current drive type, a voltage of the transmission signal from each of the field devices 2 is changed to be increased by two times. In contrast, when the number of the respective devices connected to the multiple-cable transmission line 1 is increased, an impedance in the communication frequency band seen from the respective devices is decreased and a voltage of the transmission signal changes to be decreased. Therefore, since this is a factor causing narrowing of the margin of noise and lowering of reliability on communication, it is necessary that each device has a wide range for allowing reception of signals.

Figure 5:
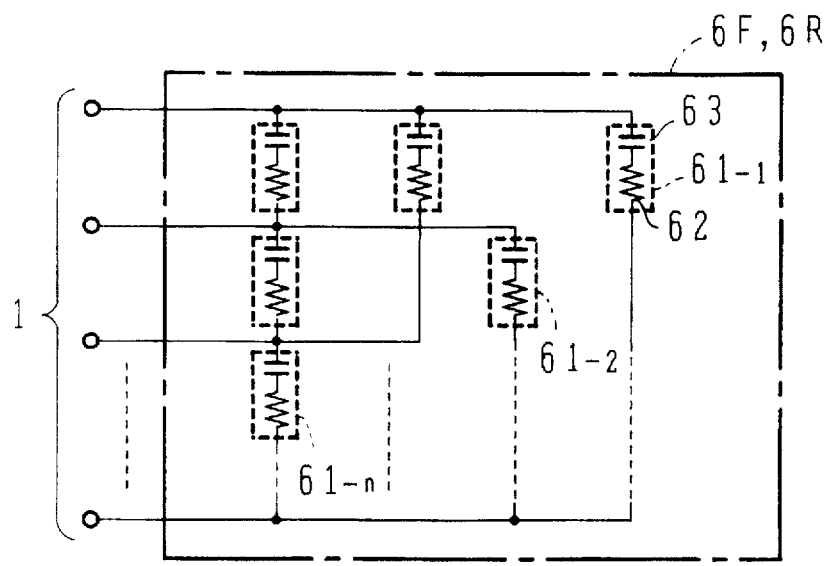
FIG. 5 is a schematic diagram illustrating an arrangement of a multiple-cable terminator.

FIG. 5 shows an arrangement of an example of the multiple-cable terminators 6F and 6R. Each of the multiple-cable terminators 6F and 6R includes terminators $61_{-1}$ to $61_{-n}$ which correspond to all pairs of the transmission cables of the multiple-cable transmission line 1, respectively. Each of the terminators $61_{-1}$ to $61_{-n}$ is constituted by a resistor 62 and a capacitor 63 connected in series and connected between a corresponding pair of the transmission cables. In the multiple-cable transmission line 1, an amplitude of the communication signal is changed depending on an impedance value of the communication frequency band, so that impedance values of the multiple-cable terminators 6F and 6R are required to be constant irrespective of the number of transmission cables. To this end, an impedance value of each of the terminators $61_{-1}$ to $61_{-n}$ is set depending on the number of the transmission cables, so that impedance values of the multiple-cable terminators 6F and 6R are always kept constant.

The upper-rank communication device 7 is connected to a desired portion of the multiple-cable transmission line 1. The upper-rank communication device 7 can perform processes such as monitoring of output values of the field devices 2 and adjustment thereof on the basis of communication through the multiple-cable transmission line 1 by operating a display or a keyboard provided in the upper-rank communication device 7. Further, the upper-rank communication device 7 can be removed from the multiple-cable transmission line 1 since the upper-rank communication device 7 is not required to be connected to the multiple-cable transmission line 1 except for periods performing the aforementioned processes. Further, the upper-rank communication device 7 is not necessarily connected to all transmission cables of the multiple-cable transmission line 1. In this respect, the upper-rank communication device 7 is constituted in a manner that even when the system employs such a communication protocol like the token passing that the communication is performed in a predetermined sequence, the communication can be performed by interruption. In the case where the upper-rank communication device 7 is connected to all transmission cables of the multiple-cable transmission line 1, the upper-rank communication device 7 is required to have a transmission cable switcher like that of the upper-rank apparatus and current consumed by the upper-rank communication device 7 through the multiple-cable communication line 1 is required to satisfy the aforementioned condition shown in FIG. 4.

Figure 6:
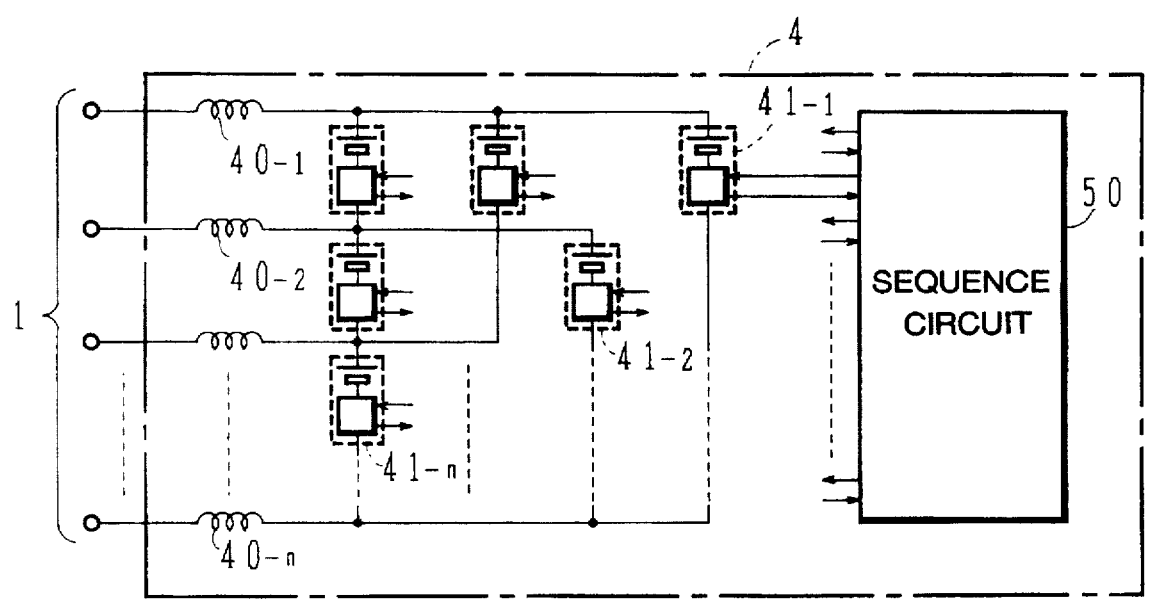
FIG. 6 is a schematic diagram illustrating an arrangement of an external power supply.

The external power supply 4 not only supplies operation power to the field devices 2 through the multiple-cable transmission line 1 but selectively switches a pair of transmission cables of the multiple-cable transmission cable 1 upon failure thereof or when necessary. To this end, as shown in FIG. 6, the external power supply 4 is constituted by a multiplicity of power supply portions $41_{-1}$ to $41_{-n}$ connected to all pairs of the transmission cables of the multiple-cable transmission line 1, respectively, and a sequence circuit or selecting unit 50. Inductors $40_{-1}$ to $40_{-n}$ are inserted in the respective transmission cables so as to lower influence to the communication signal and increase an impedance value in the communication frequency band. The power supply portions $41_{-1}$ to $41_{-n}$ and the sequence circuit 50 constitute a selective switch unit.

Figure 7:
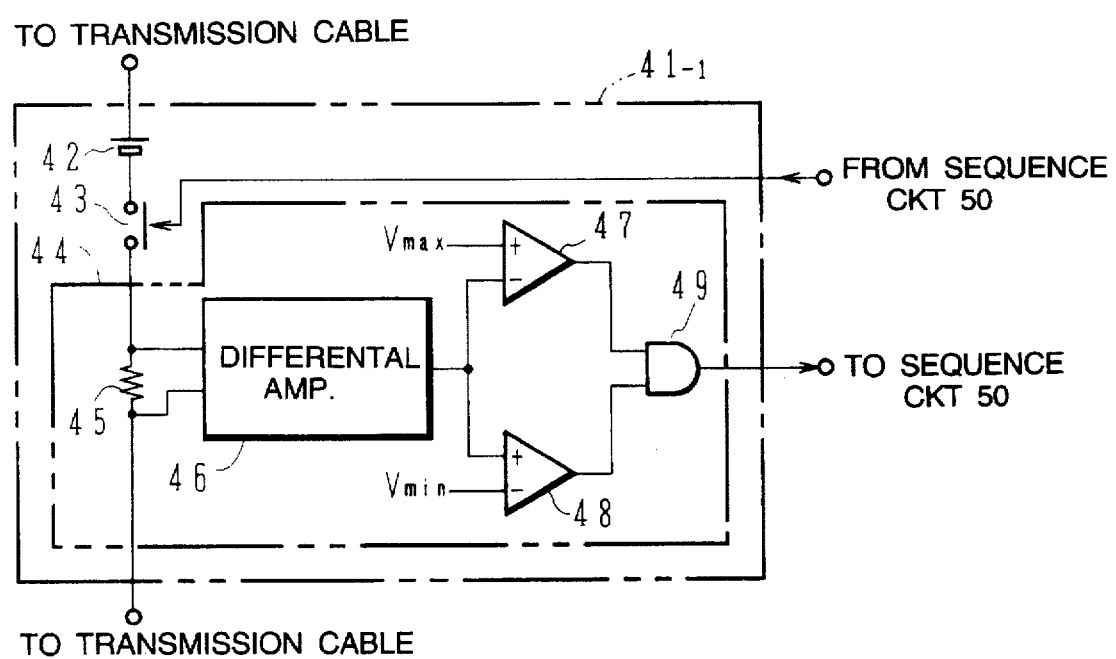
FIG. 7 is a schematic diagram illustrating an arrangement of a power supply portion of the external power supply.

Each of the power supply portions $41_{-1}$ to $41_{-n}$ is constituted by, like the power supply portion $41_{-1}$ exemplarily shown in FIG. 7, a DC power supply 42, a switch 43 and a failure detection circuit 44, which are connected in series between corresponding one pair of the transmission cables. The switch 43 is turned on and off in accordance with a command signal from the sequence circuit 50. The failure detection circuit 44 is constituted by a load resistor 45 connected to the switch 43, a differential amplifier 46 for extracting a voltage difference between opposite ends of the load resistor 45, comparators 47 and 48 for defining normal upper and lower limits, that is, normal operation range of the voltage difference, and a logical circuit, for example, an AND circuit 49 for supplying a failure signal to the sequence circuit 50 when the voltage difference is out of the normal operation range.

The switch 43 is operated in response to the command signal from the sequence circuit 50 described below to thereby apply a DC voltage between the corresponding pair of the transmission cables from the DC power supply 42. In this case, the sequence circuit 50 instructs all the power supply portions $41_{-1}$ to $41_{-n}$ in a manner that only one of the DC power supplies 42 connected between the respective pairs of transmission cables is made valid or operable and all the remaining DC power supplies 42 are made invalid or inoperable. In the failure detection circuit 44 corresponding to the valid DC power supply 42, a voltage difference between the opposite ends of the load resistor 45 connected to the valid DC power supply 42 is extracted by the differential amplifier 46 to thereby detect a current flowing through the pair of transmission cables to which the DC voltage is applied. A signal representing the detected current, that is, the detected voltage difference is determined whether or not it is within the normal operation range by the comparators 47 and 48. When the signal value or the voltage difference is between a maximum voltage $V_{max}$ and a minimum voltage $V_{min}$ respectively applied to the comparators 47 and 48, that is, within the normal range, each of the comparators 47 and 48 outputs a high ("H") level, thereby a normal signal is supplied to the sequence circuit 50 from the logical circuit 49.

Figure 8:
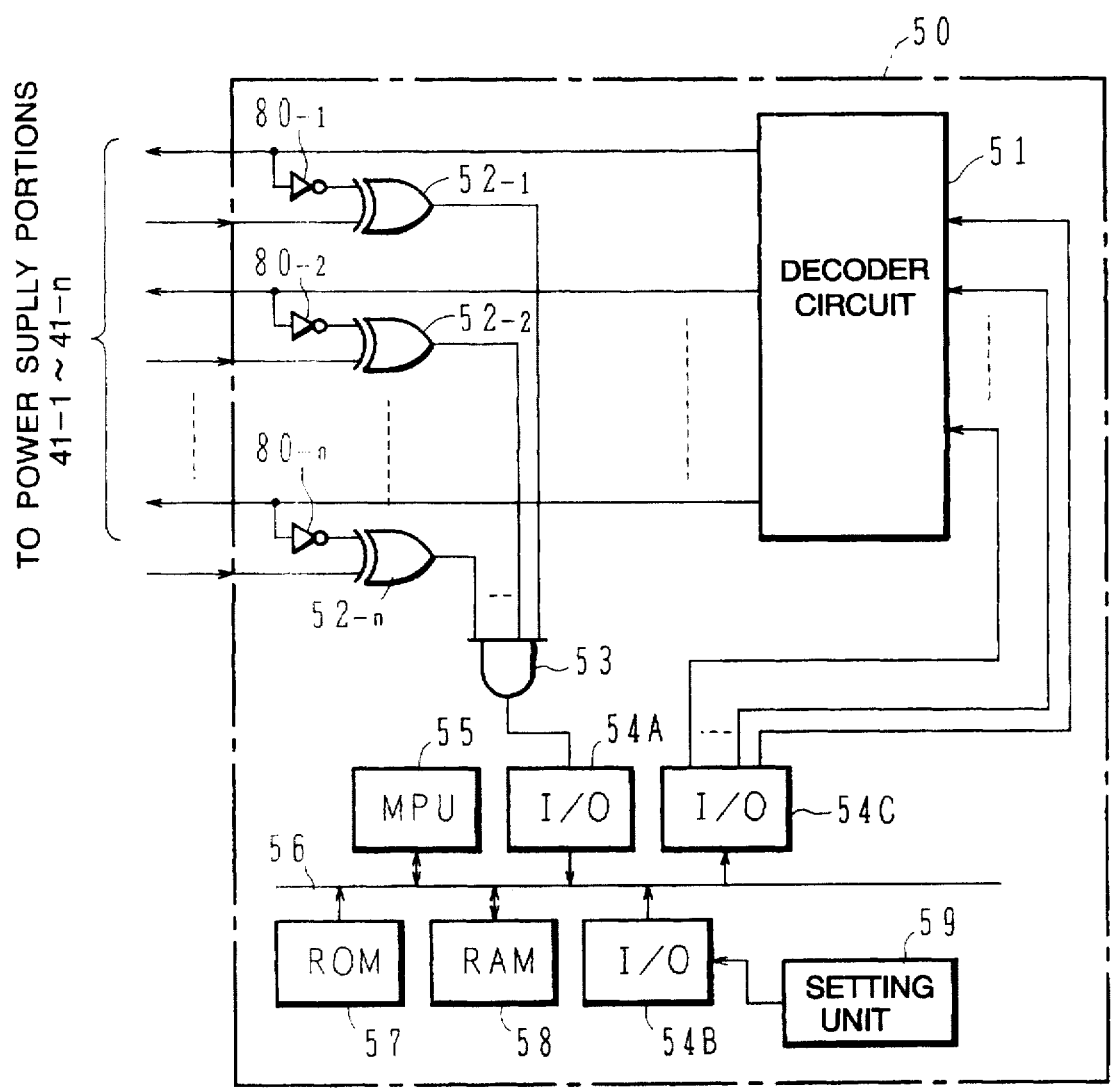
FIG. 8 is a diagram showing an arrangement of a sequence circuit of the external power supply.

As shown in FIG. 8, the sequence circuit 50 includes a decoder circuit 51 which applies the command signal to the switch 43 of each of the power supply portions $41_{-1}$ to $41_{-n}$ to thereby select or make valid only one DC power supply 42. The command signal represents "1" and "0" when the corresponding pair of transmission cables are to be used and not to be used, respectively. The command signals from the decoder circuit 51 are also supplied to one input terminals of exclusive OR circuits $52_{-1}$ to $52_{-n}$ through inverter elements $80_{-1}$ to $80_{-n}$, respectively. The output signals of the logical circuits 49 of the power supply portions $41_{-1}$ to $41_{-n}$ are supplied to the other input terminals of the exclusive OR circuits $52_{-1}$ to $52_{-n}$, respectively. Outputs of the exclusive OR circuits $52_{-1}$ to $52_{-n}$ are connected to inputs of a logical circuit (AND circuit) 53, an output of which is connected through a first I/O interface 54A and a bus 56 to a microprocessor (MPU) 55 for judging and monitoring whether the respective pairs of transmission cables are faulty or normal. The microprocessor 55 is also connected through the bus 56 to a ROM 57 and a RAM 58 each storing various data, a second I/O interface 54B and a third I/O interface 54C. A setting unit 59 for setting in advance selection sequence of the respective pairs of the transmission cables is connected to the second I/O interface 54B and the decoder circuit 51 is connected to the third I/O interface 54C through wirings corresponding to the respective switches 43 of the power supply portions $41_{-1}$ to $41_{-n}$.

The microprocessor 55 of the sequence circuit 50 determines whether the currently used pair of transmission cables are faulty or not. In this embodiment, for example, the command signal from the decoder circuit 51 represents "1" and "0" when the corresponding pair of transmission cables are to be used (the corresponding switch is on) and not to be used (the corresponding switch is off), respectively. Further, the output of the logical circuit 49 of each of the power supply portions $41_{-1}$ to $41_{-n}$ represents "1" and "0" when the corresponding pair of the transmission cables are normal and faulty or not in-use, respectively. Therefore, when a pair of the transmission cables currently used are normal and all the remaining pairs of the transmission cables are not currently used, all the exclusive OR circuits $52_{-1}$ to $52_{-n}$ output "1", so that it is determined that the currently used pair of the transmission cables are normal. On the contrary, when an output of the logical circuit 49 of the power supply portion 41 corresponding to the currently used pair of transmission cables is "0", the exclusive OR circuit 52 corresponding to the power supply portion outputs "0", so that the currently used pair of transmission cables are determined to be failure. The determination of failure of the pair of transmission cables is performed by the microprocessor 55 through the first I/O interface 54A. When the pair of the transmission cables are determined to be failure, the microprocessor 55 stores data representing the failure in the RAM 58, and further outputs a command for switching the failure pair to another pair of transmission cables to be used upon failure in accordance with the sequence set by the setting unit 59 to the decoder circuit 51 through the third I/O interface 54C, whereby the decoder circuit 51 performs the switching operation of the switches 43, that is, pairs of transmission cables as described above.

Switching operation of the transmission line 1 in the case of failure thereof in the multiple-cable field bus system of the embodiment will be described referring to the flowchart of FIG. 9.

Figure 9:
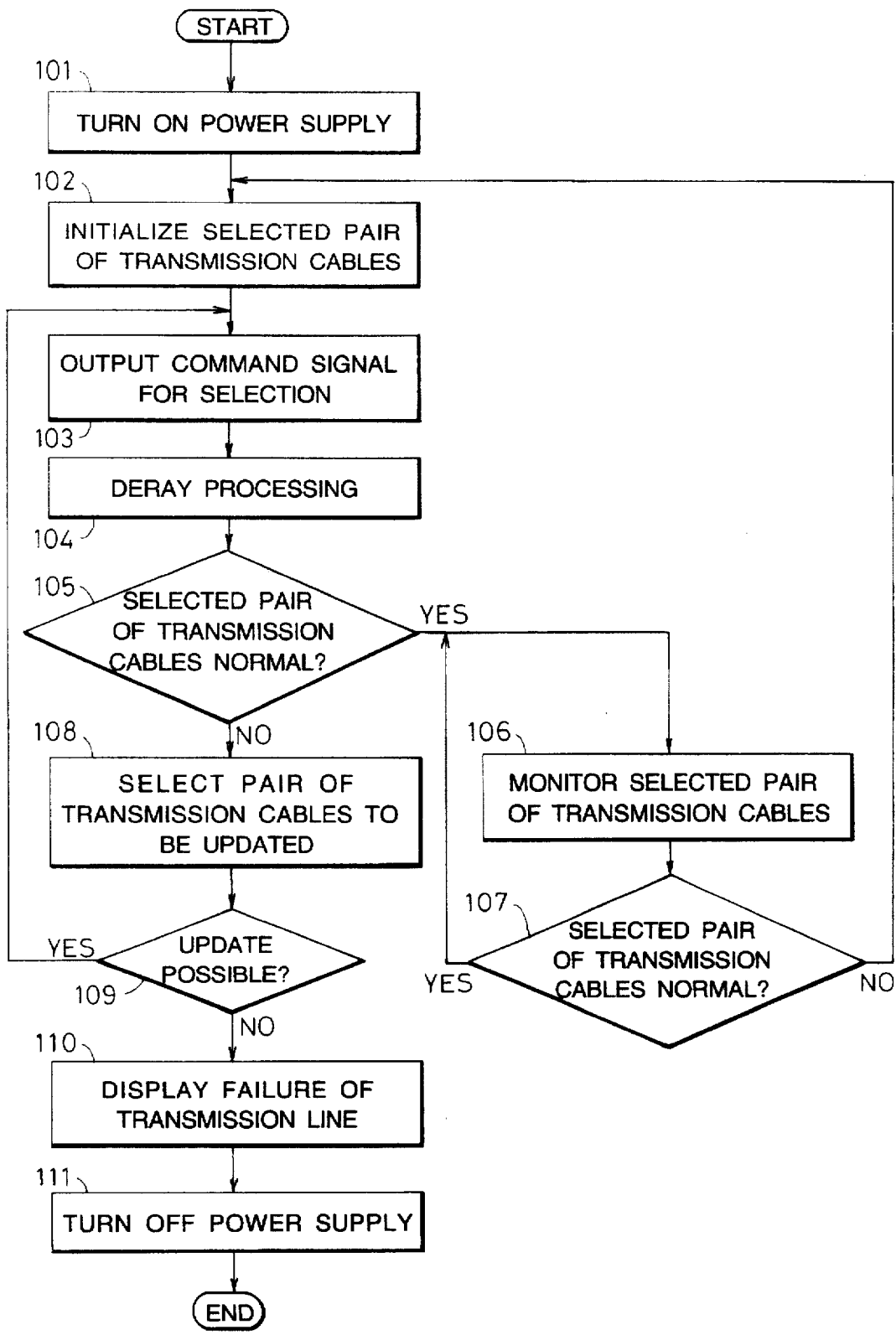
FIG. 9 is a flowchart showing a switching operation of the transmission line upon failure thereof.

Referring to FIG. 9, if the system is started by turning on a power supply (not shown) of the sequence circuit 50 in step 101, the selected pair of transmission cables are initialized in step 102. Then, the command signal for selection is supplied from the decoder circuit 51 to the switch 43 of the power supply portion 41 corresponding to the selected pair of transmission cables in step 103, so that a DC voltage is applied between the selected pair of transmission cables to place the selected pair in a usable state. Simultaneously, data representing states of the respective pairs of transmission cables are input into the microprocessor 55 through the exclusive OR circuits $52_{-1}$ to $52_{-n}$ of the external power supply 4 and the logical circuit 53 and then subjected to a delay processing in step 104, and it is determined in step 105 whether the selected pair of transmission cables are normal or not.

If it is determined that the selected pair of transmission cables are normal, the selected pair of transmission cables are monitored by the microprocessor 55 in step 106. Then, it is determined again in step 107 whether the selected pair of transmission cables are normal or not. If it is determined in step 107 that the selected pair of transmission cables has failed, the processing returns to step 102, whereat initialization of a pair of transmission cables is performed. On the contrary, if it is determined in step 107 that the selected pair of transmission cables are normal, the steps 106 and 107 are repeatedly executed until it is determined that the selected pair of transmission cables have failed.

If it is determined in step 105 that the selected pair of transmission cables have failed, then the process proceeds to step 108, whereat a pair of transmission cables to be updated or replaced is selected in accordance with the data representing the sequence which was previously set and stored in the RAM 58 by the setting unit 59. Then, it is determined in step 109 whether or not the newly selected pair of transmission cables by the update process are usable. If it is determined that the newly selected pair are usable, the command signal is output from the decoder circuit 51 in step 103. In contrast, if it is determined that the newly selected pair are not usable, failure of the transmission line is displayed on a display unit (not shown) in step 110 and the power supply of the sequence circuit 50 is turned off in step 111.

As described above, in accordance with the aforementioned embodiment, even if communication error occurs due to the failure of a currently used pair of transmission cables, the failure is detected based on the voltage applied across the currently used pair of transmission cables and further the failed pair are replaced by another pair of transmission cables by switching the application of voltage. As a consequence, since the switching operation to the pair of transmission cables to be used is performed instantaneously, the communication can be continued without interruption and the transmission ability of the system can be maintained without degrading the high reliability thereof. Further, since each of the upper-rank apparatus and the field devices is connected to the transmission line in accordance with the switching operation of the voltage application from the external power supply by merely providing the interface simply constituted only by the rectifier elements, there is no necessity of incorporating an expensive interface in each of the devices nor designing the system by taking into consideration the transmission line except for the external power supply, so that the system can be easily shifted at lower cost from the conventional system. Further, since the transmission line is constituted by three or more transmission cables, the number of the transmission cables can be increased easily and such a phenomenon that all transmission cables simultaneously fail can be prevented by wiring the cables through various paths respectively.

While the described embodiment employs a differential pressure transmitter as a field device, the described embodiment may be applied to another type of field device.

Figure 10:
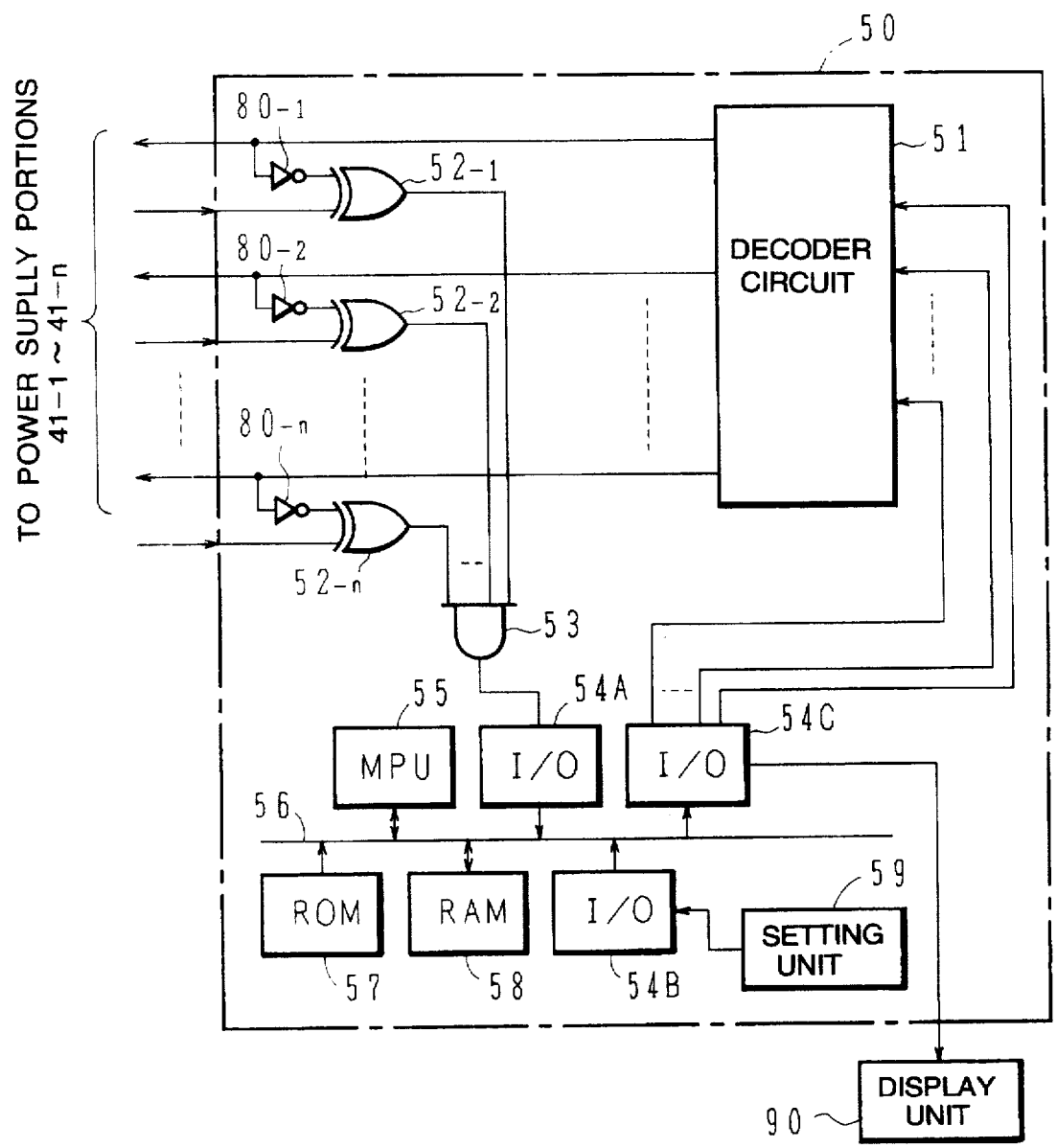
FIG. 10 is a diagram showing an arrangement of modification of the sequence circuit shown in FIG. 8.

FIG. 10 shows a modified example of the sequence circuit 50 shown in FIG. 8. As shown in FIG. 10, the modified sequence circuit 50 further includes a display unit 90 to which data as to failure pair of transmission cables stored in the RAM 58 is supplied through the third I/O interface 54C and displayed thereon. When the interface circuit 50 or the like is constituted to display data as to the failed pair of transmission cables in this manner, the failed pair of transmission cables can be promptly recognized, which is convenient in view of the inspection and repair or the like of the transmission line.

Figure 11:
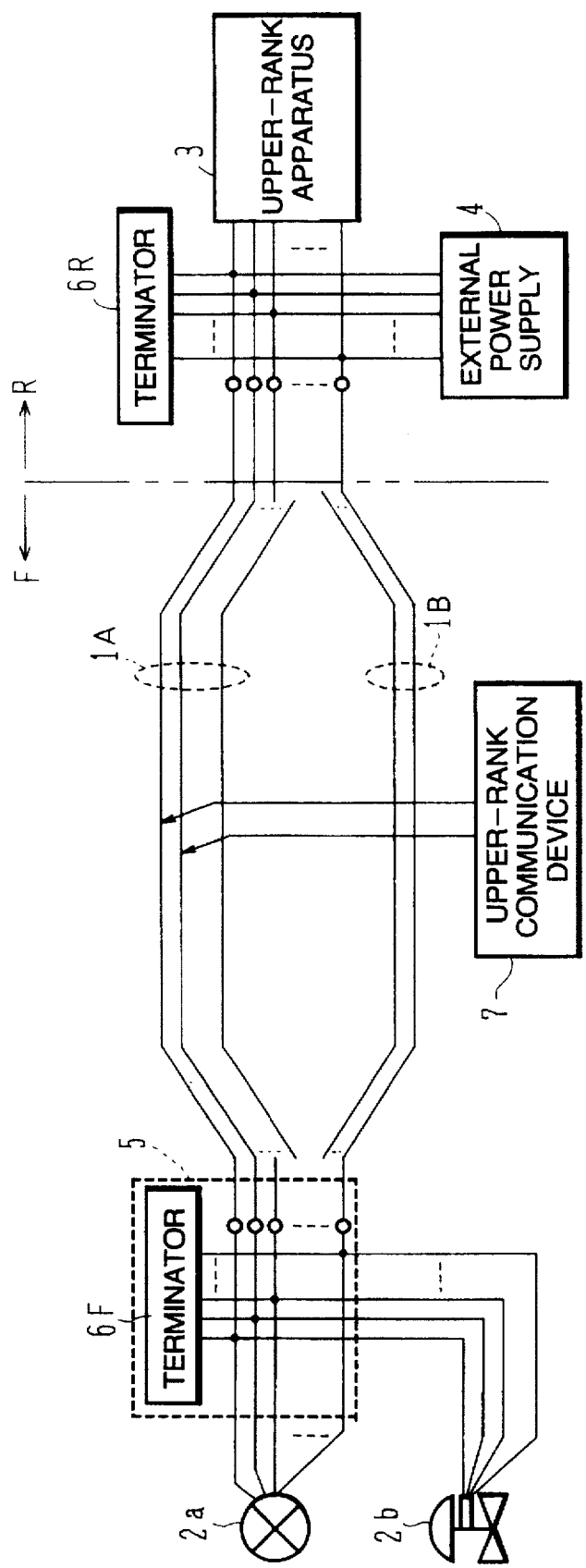
FIG. 11 is a schematic diagram showing an arrangement of a multiple-cable field bus system according to a second embodiment of he present invention.

FIG. 11 shows an arrangement according to a second embodiment of the present invention. In the second embodiment, the multiple-cable transmission line is divided into a first group of transmission cables 1A and a second group of transmission cables 1B and a path of the first group 1A differs from that of the second group 1B. The rest of the constructions in the second embodiment is the same as those of the first embodiment. In the case where the multiple-cable transmission line is divided in the first and second groups 1A and 1B in different paths like the second embodiment, it is prevented that all the transmission cables are placed in an open-loop state or a short-circuited state, so that the system can be improved in reliability because the possibility of inoperativeness of communication is greatly decreased.

Figure 12:
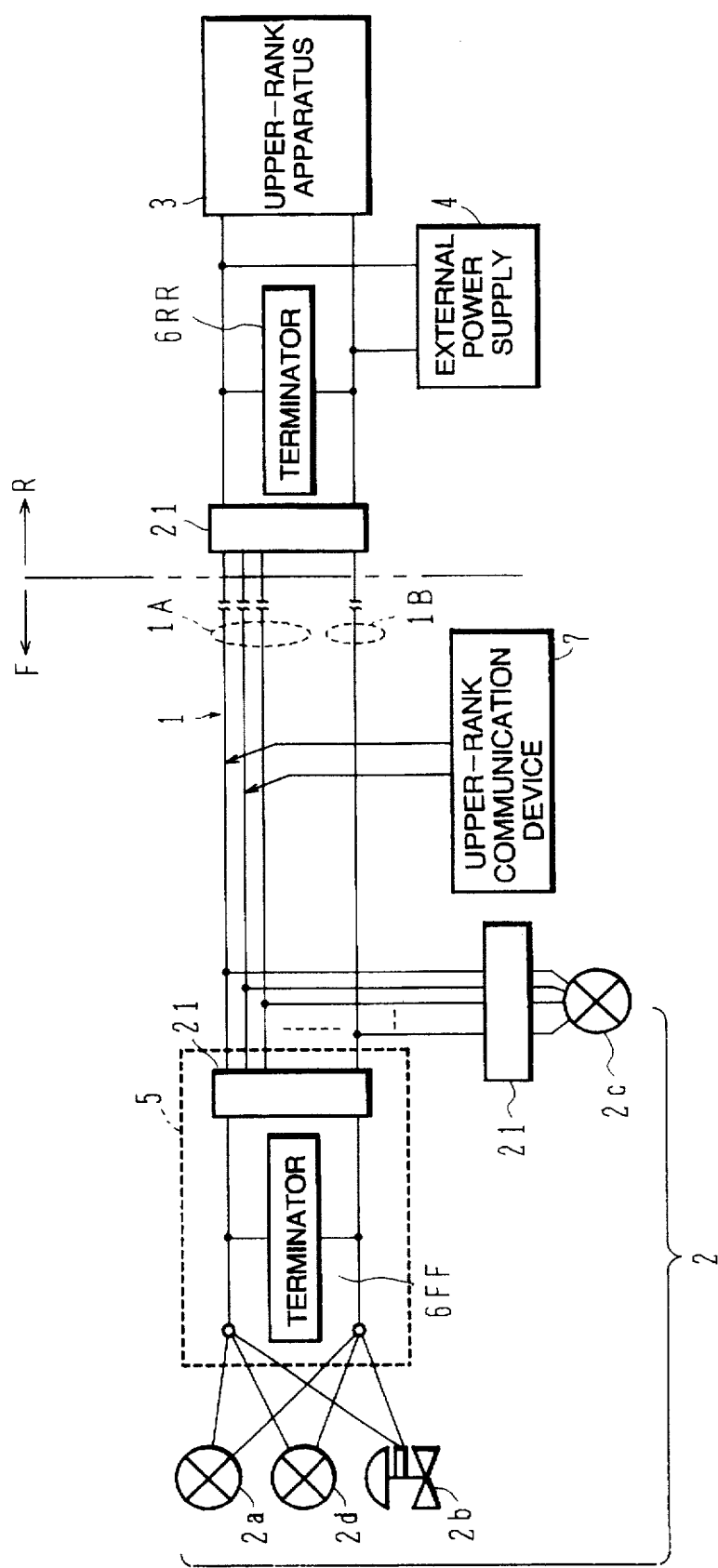
FIG. 12 is a schematic diagram showing an arrangement of a multiple-cable field bus system according to a third embodiment of the present invention.

FIG. 12 shows an arrangement according to a third embodiment of the present invention. The third embodiment differs from the first embodiment in the following points. First, the transmission cable switchers 21 are provided out of the respective field devices 2a, 2b, 2c, 2d and the upper-rank apparatus 3 and terminators 6FF and 6RR are configured so as not to be adapted for multiple-cable. Further the relay terminal panel 5 in the field side includes the transmission cable switcher 21 and the terminator 6FF, and the multiple-cable transmission line 1 is divided in two groups 1A and 1B in different paths.

According to the third embodiment, a technical advantage like that of the first embodiment can be attained. Further, since the transmission line is divided in different paths, it is prevented that all the transmission cables are placed in an open-loop state or a short-circuited state, so that the system can be improved in reliability because the possibility of inoperativeness of communication is greatly decreased.

Another example of the multiple-cable transmission line will be explained with reference to FIG. 13.

In general, stranded or twisted pair cables are used as a transmission line for the field bus system. However, in the case of shifting the system from a conventional system to a field bus system, parallel cables may be used so as to use the transmission line of the conventional system as it is. Because parallel cables in a range of 2 to about 50 cables are generally and mainly used, and because, as shown in FIG. 13, a bundle of cables are numbered in the order of starting from the center layer thereof, the cables of the same layer are used for wiring. Further, the parallel cables create a large crosstalk between transmission lines, so that there is a limitation in the length of the transmission line allowed to be used. In particular, crosstalk is large between adjacent transmission cables of the same layer, resulting in degradation of reliability of the communication.

Figure 13:
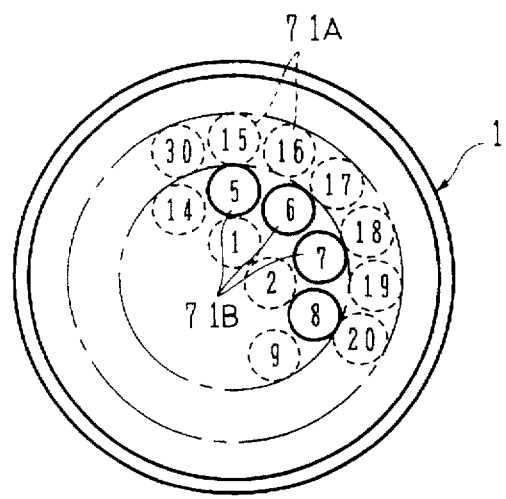
FIG. 13 is a schematic sectional view illustrating another example of a multiple-cable transmission line used in the present invention.
Figure 14:
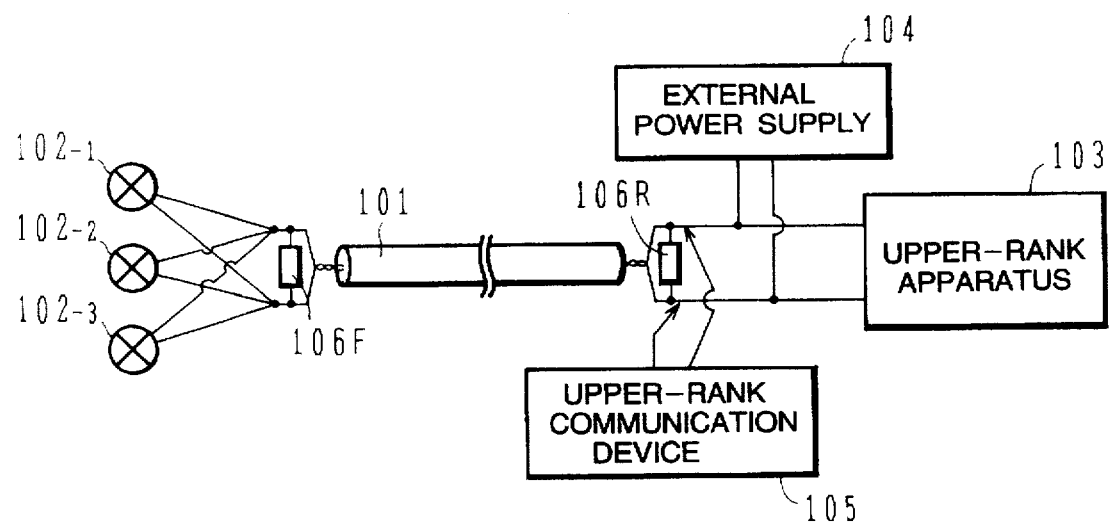
FIG. 14 is a schematic diagram showing an arrangement of an example of a conventional field bus system.

Therefore, a transmission line 71B of continuous numbers 5 to 8 shown in FIG. 13 are used in a manner that the outer numbers 5 and 8 are assigned to the reserve line so as to prevent the influence of crosstalk from the cables of the numbers 9 and 14 in the same layer onto the main cable. Further, because the direction of currents flowing in a pair of transmission cables are reverse to each other and because adjacent cables are used as a pair, crosstalk from cable lines of adjacent layers is completely canceled.

Accordingly, in the example of FIG. 13, influence of crosstalk can be reduced even in the case where parallel cables are used as the transmission line. Accordingly, not only can reliability on transmission data be improved but the length of the transmission line allowed to be used can be extended.

As set out above, the multiple-cable field bus system according to the present invention includes the multiple-cable transmission line having at least three transmission cables, the transmission cable switcher or a first transmission line switching unit connected between the multiple-cable transmission line and the field devices for supplying current or a signal of a predetermined polarity to the field devices, the other transmission cable switcher or a second transmission line switching unit connected between the multiple-cable transmission line and the upper-rank apparatus for supplying current or a signal of a predetermined polarity, the external power supply for detecting whether or not the selected pair of transmission cables have failed and, when a failure is determined, for supplying electric power to another normal pair of transmission cables. According to the thus constituted multiple-cable field bus system, even if communication error occurs due to the failure of a currently used pair of transmission cables, the failure is detected and the failure pair are replaced by another normal pair of transmission cables, so that the communication can be continued and the transmission ability of the system can be maintained without degrading the high reliability thereof. Further, since each of the upper-rank apparatus and the field devices is connected to the transmission line in accordance with the switching operation of the voltage application from the external power supply by merely providing the interface of simple constitution, there is no necessity of incorporating an expensive interface in each of the devices, so that the system can be easily shifted at lower cost from the conventional system.

Having described the preferred embodiments of the invention with reference to the accompanying drawings, it is to be understood that the present invention is not limited to those precise embodiments and that various changes and modifications thereof could be effected by one skilled in the art without departing from the spirit or scope of the invention as defined in the appended claims.

What is claimed is:

1. A multiple-cable field bus system for mutually performing communication between a plurality of field devices for detecting physical quantities and an upper-rank apparatus for receiving signals representing said physical quantities and for supplying control signals to said field devices, said multiple-cable field bus system including an external power supply for supplying electric power to the plurality of field devices, said multiple-cable field bus system comprising:

a multiple-cable transmission line having at least three transmission cables for mutually performing communication between said field devices and said upper-rank apparatus, wherein each transmission cable transmits communication signals and electric power;

terminators connected to said multiple-cable transmission line;

a plurality of first transmission line switching means, each said first transmission line switching means connected to all of said transmission cables of said multiple-cable transmission line and to one of said plurality of field devices, the plurality of first transmission line switching means supplying electric power and communication signals to the plurality of field devices through a selected pair of the at least three transmission cables; and second transmission line switching means connected to said multiple-cable transmission line and the upper-rank apparatus for supplying the communication signals to the upper-rank apparatus through said selected pair of the transmission cables;

wherein said external power supply is connected to all of the cables of said multiple-cable transmission line, said external power supply supplies electric power to the plurality of said field devices via said selected pair of transmission cables, said external power supply further determining whether a failure of the communication between the upper-rank apparatus and any of the plurality of field devices has occurred in the selected pair of transmission cables or not, and, when it is determined that the selected pair of transmission cables has failed, supplying electric power to another pair of the at least three transmission cables of said multiple-cable transmission line.

2. A multiple-cable field bus system according to claim 1, wherein said external power supply includes:

a plurality of power supply portions, each of which is connected between one pair of said transmission cables of the multiple-cable transmission line, each of said power supply portions including a direct current power supply and a switch connected in series with each other;

detecting means connected to the transmission cables and detecting a failure occurring in each pair of said transmission cables and for outputting a failure detection signal in response to said failure; and transmission cable selecting means connected to the detecting means and opening a switch connected between a pair of said transmission cables in which a failure has occurred and closing a switch connected between a normal pair of said transmission cables in accordance with said failure detection signal.

3. A multiple-cable field bus system according to claim 2, wherein each of said power supply portions of said external power supply further includes a load resistor connected in series with said direct current power supply and said switch, and said detecting means detects a failure which has occurred in a pair of said transmission cables in accordance with a voltage across said load resistor thereof.

4. A multiple-cable field bus system according to claim 2, wherein said external power supply includes selection sequence setting means for setting a sequence of selection of all pairs of transmission cables of said multiple-cable transmission line, and said transmission cable selecting means selects the normal pair of said transmission cables in accordance with the sequence of selection set by said selection sequence setting means.

5. A multiple-cable field bus system according to claim 4, wherein said transmission cable selecting means includes storage means for storing information as to transmission cables in which failure has occurred.

6. A multiple-cable field bus system according to claim 1, wherein each said first transmission line switching means includes a plurality of rectifier elements connected between said multiple-cable transmission line and one of said field devices for transmitting the communication signal only in a direction from said multiple-cable transmission line to said one field device, and each of said first transmission line switching means includes a plurality of rectifier elements connected between said multiple-cable transmission line and said field device for transmitting the communication signal only in a direction from said field device to said multiple-cable transmission line, and wherein said second transmission line switching means includes a plurality of rectifier elements connected between said multiple-cable transmission line and said upper-rank apparatus for transmitting the communication signal only in a direction from said multiple-cable transmission line to said upper-rank apparatus, and each of said second transmission line switching means includes a plurality of rectifier elements connected between said multiple-cable transmission line and said upper-rank apparatus for transmitting the communication signal only in a direction from said upper-rank apparatus to said multiple-cable transmission line.

7. A multiple-cable field bus system according to claim 6, wherein at least one of said field devices and said first transmission line switching means are integrated.

8. A multiple-cable field bus system according to claim 6, wherein said upper-rank apparatus and said second transmission line switching means are integrated.

9. A multiple-cable field bus system according to claim 1, wherein both said plurality of first transmission line switching means and said terminators are arranged in a junction box provided in a field.

10. A multiple-cable field bus system according to claim 9, wherein said multiple-cable transmission line connected between said upper-rank apparatus and said junction box is divided in at least two paths.

11. A multiple-cable field bus system according to claim 1, wherein an impedance value of said terminator is changed depending on a number of cables of said multiple-cable transmission line.

12. A multiple-cable field bus system according to claim 1, wherein said multiple-cable transmission line includes a plurality of parallel transmission cables, and a pair of transmission cables adjacently disposed with each other is selected for performing mutual communication between the field devices and the upper-rank apparatus.

13. A multiple-cable field bus system according to claim 5, further comprising means for displaying said information as to the failure pair of transmission cables stored in said storage means.

14. A multiple-cable field bus system according to claim 2, wherein each said first transmission line switching means includes a plurality of rectifier elements connected between said multiple-cable transmission line and one of said field devices for transmitting the communication signal only in a direction from said multiple-cable transmission line to said one field device, and each of said first transmission line switching means includes a plurality of rectifier elements connected between said multiple-cable transmission line and said field device for transmitting the communication signal only in a direction from said field device to said multiple-cable transmission line, and wherein said second transmission line switching means includes a plurality of rectifier elements connected between said multiple-cable transmission line and said upper-rank apparatus for transmitting the communication signal only in a direction from said multiple-cable transmission line to said upper-rank apparatus, and each of said second transmission line switching means includes a plurality of rectifier elements connected between said multiple-cable transmission line and said upper-rank apparatus for transmitting the communication signal only in a direction from said upper-rank apparatus to said multiple-cable transmission line.

15. A multiple-cable field bus system according to claim 14, wherein at least one of said field devices and at least one of said first transmission line switching means are integrated.

16. A multiple-cable field bus system according to claim 14, wherein said upper-rank apparatus and said second transmission line switching means are integrated.

17. A multiple-cable field bus system according to claim 2, wherein both said plurality of first transmission line switching means and said terminator are arranged in a junction box provided in a field.

18. A multiple-cable field bus system according to claim 1, wherein said physical quantities include at least one of pressure, temperature and flow rate.

19. A multiple cable field bus system for mutually performing communication between a plurality of field devices for detecting physical quantities and an upper-rank apparatus for receiving signals representing said physical quantities and for supplying control signals to said plurality of field devices, said multiple cable field bus system comprising:

a multiple-cable transmission line having at least three transmission cables, wherein each transmission cable transmits electric power and communication signals;

terminators connected to said multiple cable transmission line;

a plurality of first transmission cable switchers, each said first transmission cable switcher having a plurality of first rectifier elements, anodes of said first rectifier elements connected to said multiple cable transmission line, cathodes of said first rectifier elements connected to one of said field devices, each said first transmission cable switcher having a plurality of second rectifier elements, cathodes of said second rectifier elements connected to all of the cables of said multiple cable transmission line, anodes of said second rectifier elements connected to said one of said field devices, wherein said plurality of first transmission cable switchers supply communication signals and electric power to said plurality of field devices;

a second transmission cable switcher having a plurality of first rectifier elements, anodes of said first rectifier elements connected to all of the cables of said multiple cable transmission line, cathodes of said first rectifier elements connected to said upper-rank apparatus, said second transmission cable switcher having a plurality of second rectifier elements, cathodes of said second rectifier elements connected to all of the cables of said multiple cable transmission line, anodes of said second rectifier elements connected to said upper-rank apparatus; and an external power supply including a plurality of power supply portions, each of which is connected between one pair of said transmission cables of said multiple cable transmission line, each of said power supply portions including a direct current power supply, a switch, and a voltage detecting circuit, said external power supply including a sequence circuit connected to said switch and voltage detecting circuit, said sequence circuit including a decoder circuit applying command signal to said switch, a plurality of logical circuits, and a microprocessor supplying command signal to said decoder, wherein the external power supply is connected to all of the cables of said multiple-cable transmission line, said external power supply selects one pair of said transmission cables to supply electric power to said plurality of field devices, and upon detection of a malfunction of said selected one pair of transmission cables, supplying electric power to said plurality of field devices via another pair of said transmission cables.

20. A multiple-cable field bus system according to claim 2, wherein an impedance value of said terminator is changed depending on a number of cables of said multiple-cable transmission line.

* * * * *

UNITED STATES PATENT AND TRADEMARK OFFICE
CERTIFICATE OF CORRECTION

PATENT NO. : 5,757,265
DATED : 26 May 1998
INVENTOR(S) : Makoto KOGURE et al.

It is certified that error appears in the above-identified patent and that said Letters Patent is hereby corrected as shown below:

| Column | Line | |
|--------|------|---|
| 6 | 1 | After "line" insert --1--. |
| 7 | 62 | After "value" delete "than". |

Signed and Sealed this

Ninth Day of March, 1999

Attest:

Attesting Officer

Q. TODD DICKINSON

Acting Commissioner of Patents and Trademarks